United States Patent
Wu

(10) Patent No.: US 10,466,065 B2
(45) Date of Patent: Nov. 5, 2019

(54) METHOD AND SYSTEM FOR CORRECTING DRIVING AMPLITUDE OF GYRO SENSOR

(71) Applicant: CSMC TECHNOLOGIES FAB2 CO., LTD., Jiangsu (CN)

(72) Inventor: Huagang Wu, Jiangsu (CN)

(73) Assignee: CSMC TECHNOLOGIES FAB2 CO., LTD., Wuxi New District, Jiangsu (CN)

( * ) Notice: Subject to any disclaimer, the term of this patent is extended or adjusted under 35 U.S.C. 154(b) by 292 days.

(21) Appl. No.: 15/321,958

(22) PCT Filed: Jun. 26, 2015

(86) PCT No.: PCT/CN2015/082554
§ 371 (c)(1),
(2) Date: Dec. 23, 2016

(87) PCT Pub. No.: WO2015/197030
PCT Pub. Date: Dec. 30, 2015

(65) Prior Publication Data
US 2017/0131116 A1 May 11, 2017

(30) Foreign Application Priority Data
Jun. 26, 2014 (CN) .......................... 2014 1 0300802

(51) Int. Cl.
*G01C 25/00* (2006.01)
*G01C 19/56* (2012.01)
*G01C 19/5776* (2012.01)

(52) U.S. Cl.
CPC ............. *G01C 25/00* (2013.01); *G01C 19/56* (2013.01); *G01C 19/5776* (2013.01)

(58) Field of Classification Search
CPC .................................. G01C 25/00; G01C 19/56
USPC ............................................................ 73/1.77
See application file for complete search history.

(56) References Cited

U.S. PATENT DOCUMENTS 5,278,424 A    1/1994   Kagawa

FOREIGN PATENT DOCUMENTS

| CN | 1952601     | 4/2007  |
|----|-------------|---------|
| CN | 1954188     | 4/2007  |
| CN | 101042471   | 9/2007  |
| CN | 101126784   | 2/2008  |
| CN | 101900554 A | 12/2010 |
| CN | 102109345 A | 6/2011  |
| CN | 102519444 A | 6/2012  |
| CN | 102538774 A | 7/2012  |
| CN | 102928082   | 2/2013  |

(Continued)

OTHER PUBLICATIONS

International Search Report, dated Oct. 8, 2015, International Patent Application No. PCT/CN2015/082554 with English translation (8 pages).

*Primary Examiner* — John Fitzgerald
*Assistant Examiner* — Rodney T Frank
(74) *Attorney, Agent, or Firm* — Hamre, Schumann, Mueller & Larson, P.C.

(57) ABSTRACT

A method for correcting the driving amplitude of a gyro sensor, mainly comprises adjusting the size of a driving signal (a preset amplitude value) through feedback of a sensor response amplitude signal (an average amplitude value) in a resonance maintaining time period, so that the response amplitude of the resonance maintaining time period tends to be equal, and a stable resonance amplitude is maintained. Also provided is a system for correcting the driving amplitude of a gyro sensor.

8 Claims, 3 Drawing Sheets

(56) References Cited

FOREIGN PATENT DOCUMENTS

| | | |
|---|---|---|
| CN | 103363983 | 4/2013 |
| GB | 585357 | 2/1947 |
| JP | 6432113 | 2/1989 |
| JP | 2001304866 A | 10/2001 |
| JP | 2003294449 A | 10/2003 |
| JP | 200485314 | 3/2004 |
| JP | 2004294201 A | 10/2004 |

METHOD AND SYSTEM FOR CORRECTING DRIVING AMPLITUDE OF GYRO SENSOR

FIELD OF THE INVENTION

The present disclosure relates to a technical field of micro electro mechanical system, and more particularly to a method and system for calibrating driving amplitude of a gyroscope sensor.

BACKGROUND OF THE INVENTION

MEMS (Micro Electro Mechanical Systems) is a micro-integrated system manufactured by integrating a microstructure, a micro-sensor, a micro-actuator, a control processing circuit and even an interface, communication unit, and a power supply on a piece or multi-pieces of chip using integrated circuit manufacturing technology and micro-processing technology. With the development of the MEMS technology, acceleration sensors and gyroscopes manufactured by MEMS technology have been widely applied to the field of automobile and consumer electronics.

A gyroscope sensor with PZT (piezoelectric ceramic transducer) construction can be simulated by a resonant circuit of RLC, which has a certain resonant frequency. In order to increase bandwidth upon application, it is required to divide a sine driving signal of the sensor into three phases of compulsory resonance, resonance maintaining, and resonance ceasing, so that the gyroscope is able to resonate rapidly in response to external triggering events. With regard to an ideal resonant circuit, the driving time point and amplitude size of the above three phases may be known by calculating a formula. However, in practice, due to craft deviation during the manufacturing process of the sensor, asymmetry or temperature-dependent property, simply applications of the formula tends to deviate from the fact.

Referring to FIG. 1, a conventional construction of a sensor driving detection is shown as 100, which includes a charge amplifier 101, a amplitude phase and angular velocity detector 102, a ADC (analog-to-digital converter) 103, a control module 104, a DDS+DAC (digital-to-analog converter) 105, a formula or look-up table module 106, and a tunable gain amplifier 107.

In order to increase a bandwidth of a sensor application, the formula or look-up table module 106 requires to output three different amplitude values to the tunable gain amplifier 107, so that the sine signal of formula or look-up table module 106 is divided into three phases of compulsory resonance 301, resonance maintaining 302, and resonance ceasing 303 to driving sensor, upon magnified by the tunable gain amplifier 107, see FIG. 3.

A time domain response of a sensor loop amplitude value may be simulated by exponential formula $$Y(t) = X(t) \cdot G \cdot \left(1 - \exp\left(-\frac{\pi \cdot f \cdot t}{Q}\right)\right)$$

upon integrated by charge amplifier 101.

Y (t) and X (t) respectively denote a time domain signal output by charge amplifier and sensor drive, G is a loop gain from sensor to charge amplifier, Q value is a quality factor of the sensor, f is a resonant frequency of the sensor.

If we want to make the output of the charge amplifier carry out angle velocity detection upon $A^2 \cdot G$ amplitude, driving signal intensity proportion of three stages of tunable gain amplifier 107 may be calculated according to resonance oscillation loop formula as follows:

compulsory resonance:

$$A1 = \frac{1}{1 - \exp\left(-\frac{\pi \cdot f \cdot T1}{Q}\right)} \cdot A2 \tag{1}$$

resonance maintaining: $A2=A2$ \qquad (2)

$$A3 = \frac{\exp\left(-\frac{\pi \cdot f \cdot T3}{Q}\right)}{1 - \exp\left(-\frac{\pi \cdot f \cdot T3}{Q}\right)} \cdot A2 \tag{3}$$

resonance ceasing:

where T1 is time of compulsory resonance, T3 is time of resonance ceasing, T1 is generally equal to T3.

Formulas (1) (2) (3) are derived based on ideal RLC loop response signal model, but due to deviation from manufacturing gyroscope itself, it tends to make its actual response deviate from ideal model, thus the driving amplitude calculated simply using formula or look-up table can often be not able to reach the amplitude required to maintain steady resonance oscillation, whereas the precision that influence angular velocity sense, especially when the gyroscope cause a response attenuation due to usage or temperature influence, driving according to the conventional method also reduce the sensibility of corresponding sense velocity.

SUMMARY OF THE INVENTION

Based on this, it is necessary to provide a method for calibrating driving amplitude of a gyroscope sensor, the method can maintain a steady amplitude value of resonance and enhance the accuracy of angular velocity detection. A system for calibrating driving amplitude of a gyroscope sensor is also provided.

A method of calibrating a driving amplitude of a gyroscope sensor includes:

a monitoring step: obtaining an average amplitude value of a first preset number of waveforms in a resonance maintaining phase; and a calibrating step: if the average amplitude value is lower than a lowest target amplitude value, then increasing a preset amplitude value in the resonance maintaining phase; if the average amplitude value is higher than a highest target amplitude value, then reducing the preset amplitude value in the resonance maintaining phase; adjusting a preset amplitude value in a resonance ceasing phase according to the adjusted preset amplitude value in the resonance maintaining phase, and applying the adjusted preset amplitude value in the resonance maintaining phase, an unadjusted preset amplitude value in a compulsory resonance phase, and the adjusted preset amplitude value in the resonance ceasing phase to a next oscillation period.

A method of calibrating driving a amplitude of a gyroscope sensor, includes:

a monitoring step: obtaining an average amplitude value of a first preset number of waveforms of a resonance maintaining phase; and a calibrating step: if the average amplitude value is lower than a lowest target amplitude value, then increasing a preset amplitude value in a compulsory resonance phase; if the average amplitude value is higher than the highest target amplitude value, then reducing the preset amplitude value in the compulsory resonance phase; adjusting a preset amplitude value in a resonance ceasing phase according to the adjusted preset amplitude value in the compulsory resonance phase, and applying an unadjusted preset amplitude value in the resonance maintaining phase, the adjusted preset amplitude value in the compulsory resonance phase, and the adjusted preset amplitude value in the resonance ceasing phase to a next oscillation period.

A system of calibrating a driving amplitude of a gyroscope sensor includes:

a monitoring module configured to obtain an average amplitude value of a first preset number of waveforms of a resonance maintaining phase; and a calibrating module configured to determine a relationship between the average amplitude value and a lowest target amplitude value, and between the average amplitude value and a highest target amplitude value; if the average amplitude value is higher than the highest target amplitude value, then reducing a preset amplitude value in the resonance maintaining phase; adjusting a preset amplitude value in a resonance ceasing phase according to the adjusted preset amplitude value in the resonance maintaining phase, and applying the adjusted preset amplitude value in the resonance maintaining phase, an unadjusted preset amplitude value in a compulsory resonance phase, and the adjusted preset amplitude value in the resonance ceasing phase to a next oscillation period.

A system of calibrating a driving amplitude of a gyroscope sensor includes:

a monitoring module configured to obtain an average amplitude value of a first preset number of waveforms in a resonance maintaining phase; and a calibrating module configured to determine a relationship between the average amplitude value and a lowest target amplitude value, and between the average amplitude value and a highest target amplitude value; if the average amplitude value is lower than the lowest target amplitude value, then increasing the preset amplitude value in a compulsory resonance phase; if the average amplitude value is higher than the highest target amplitude value, then reducing the preset amplitude value in the compulsory resonance phase; adjusting the preset amplitude value in a resonance ceasing phase according to the adjusted preset amplitude value in the compulsory resonance phase, and applying an unadjusted preset amplitude value in the resonance maintaining phase, the adjusted preset amplitude value in the compulsory resonance phase, and the adjusted preset amplitude value in the resonance ceasing phase to a next oscillation period.

The aforementioned method and system for calibrating the driving amplitude of the gyroscope sensor adjusts the size of the driving signal (preset amplitude value) through the feedback from the sensor response amplitude value signal (average amplitude value) within the resonance maintaining phase to make the response amplitude in the resonance maintaining phase tend to be consistent, thus maintaining a steady amplitude value of resonance and enhancing the accuracy of angular velocity detection.

An exponential formula may be used in software set mode during a sensor collate stage, and records the response amplitude value and driving amplitude acquired in the sensor collate stage into a chip inherent non-volatile memory device, to ensure the response amplitude during the usage stage to correspond to it during calibration stage, therefore maintaining the consistency of the angular velocity sense. Meanwhile, the deviation caused by the sensor itself or the subsequent production flow may be improved, and the proportion of good product may be increased. In hardware cost, the algorithm of the present invention may be implemented using state machine mode, and possess advantage in terms of cost.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above objects, features and advantages of the present invention will become more apparent by describing in detail embodiments thereof with reference to the accompanying drawings.

Figure 1:
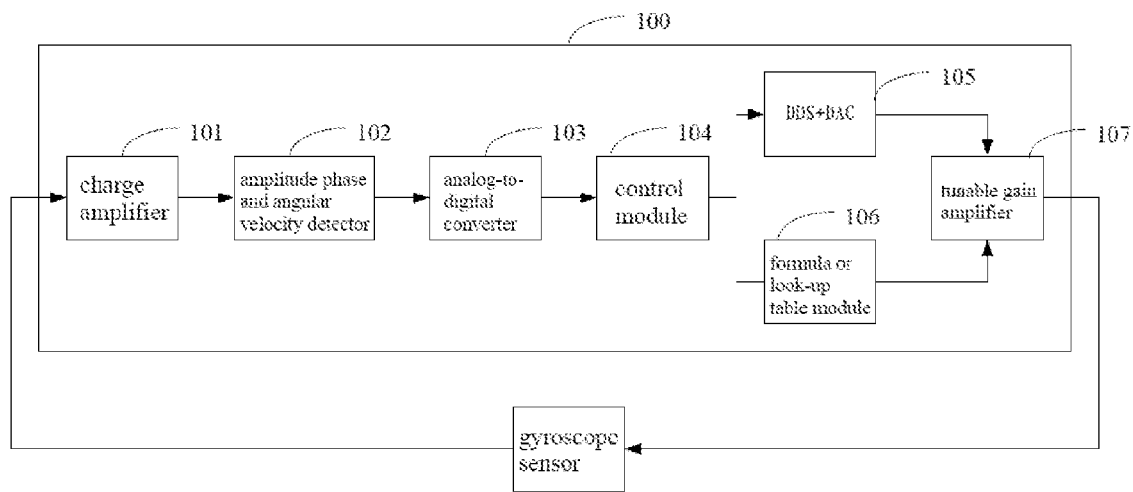
FIG. 1 is a block diagram of a conventional sensor driving detection.
Figure 2:
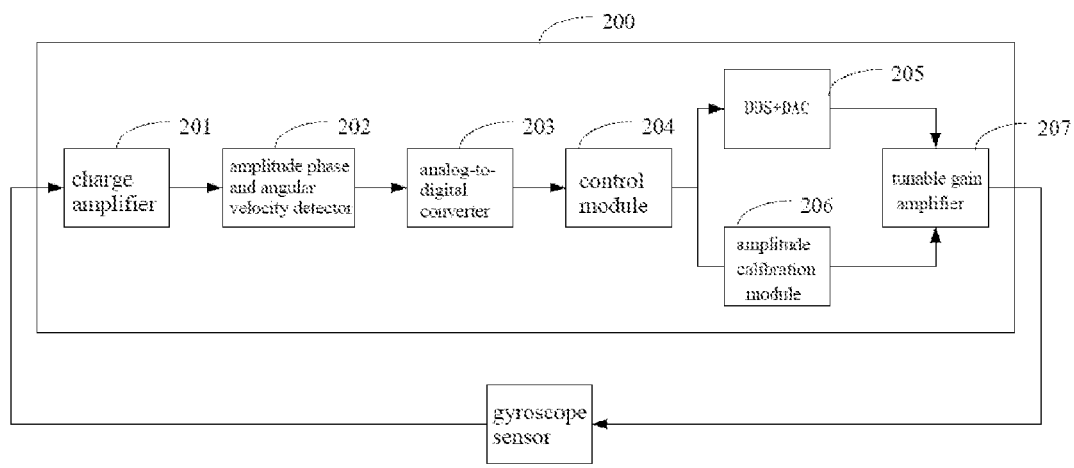
FIG. 2 is a block diagram of a sensor driving detection according to an embodiment.

FIG. 2 is a block diagram of a sensor driving detection according to an embodiment, which includes a charge amplifier 201, an amplitude phase and angular velocity detector 202, a ADC (analog-to-digital converter) 203, a control module 204, a DDS+DAC (digital-to-analog converter) 205, an amplitude correction module 206, and a tunable gain amplifier 207.

Figure 3:
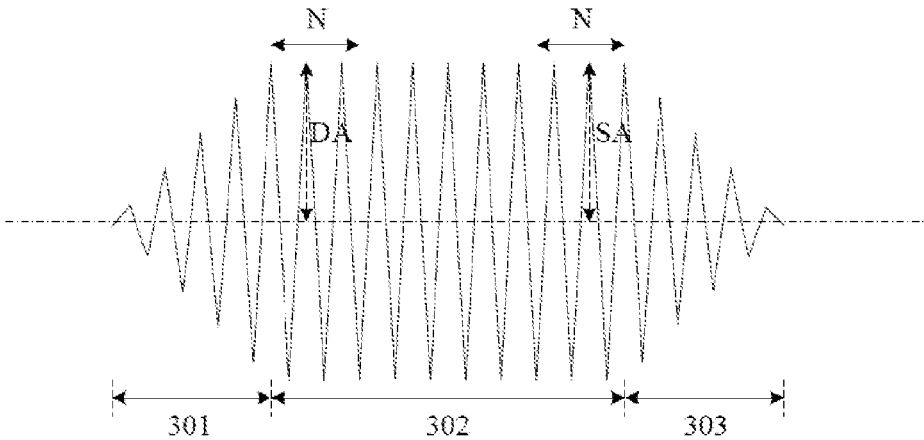
FIG. 3 is a schematic diagram of a sensor oscillation phase.

FIG. 3 is a schematic diagram of a sensor oscillation phase.

As described herein, a compulsory resonance phase is a stage within which a sine driving signal of the sensor starts to oscillate until it becomes stabilized, a resonance maintaining phase is a steady stage of the sine driving signal of the sensor, and a resonance ceasing phase is a stage within which the sine driving signal of the sensor is from steady to cease.

Assuming that a first preset number is N, an average amplitude value of a latter segment of N waveforms of the resonance maintaining phase 302 is SA, the average amplitude value of a former segment of N waveforms of the resonance maintaining phase 302 is DA. The latter segment is a stage before the resonance maintaining phase 302 ends, the former segment is a stage after the resonance maintaining phase 302 starts. In the illustrated embodiment, SA is an average amplitude value of the latter N waveforms of the resonance maintaining phase 302, and DA is an average amplitude value of the former N waveforms of the resonance maintaining phase 302. It should be noted that, in other embodiments, N waveforms may be offset appropriately and can even be an arbitrary segment in the resonance maintaining phase 302.

The lowest target amplitude value is AMPL, the highest target amplitude value is AMPH, the optimal target amplitude value is AMPM, the selection of AMPL and AMPH also should be referred to the noise quasi-potential of the system, (AMPH-AMPL)/2 is slightly greater than the noise value of the system in order to make an adaptive algorithm converge.

The preset amplitude value of the compulsory resonance phase is A1, the preset amplitude value of the resonance maintaining phase is A1, and the preset amplitude value of the resonance ceasing phase is A3. For convenience of description, A1, A2, and A3 are also denoted as actual driving amplitudes of the compulsory resonance phase 301, the resonance maintaining phase 302, and the resonance ceasing phase 303, respectively. A1, A2, and A3 satisfy the following formulas:

$$A1 = \frac{1}{1 - \exp\left(-\frac{\pi \cdot f \cdot T1}{Q}\right)} \cdot A2 \quad (1)$$

$$A3 = \frac{\exp\left(-\frac{\pi \cdot f \cdot T3}{Q}\right)}{1 - \exp\left(-\frac{\pi \cdot f \cdot T3}{Q}\right)} \cdot A2 \quad (3)$$

where T1 is time of the compulsory resonance, T3 is time of the resonance ceasing, T1 is equal to T3. Thereby the following formula is acquired:

$$A1 = A2 + A3 \quad (4)$$

Figure 4:
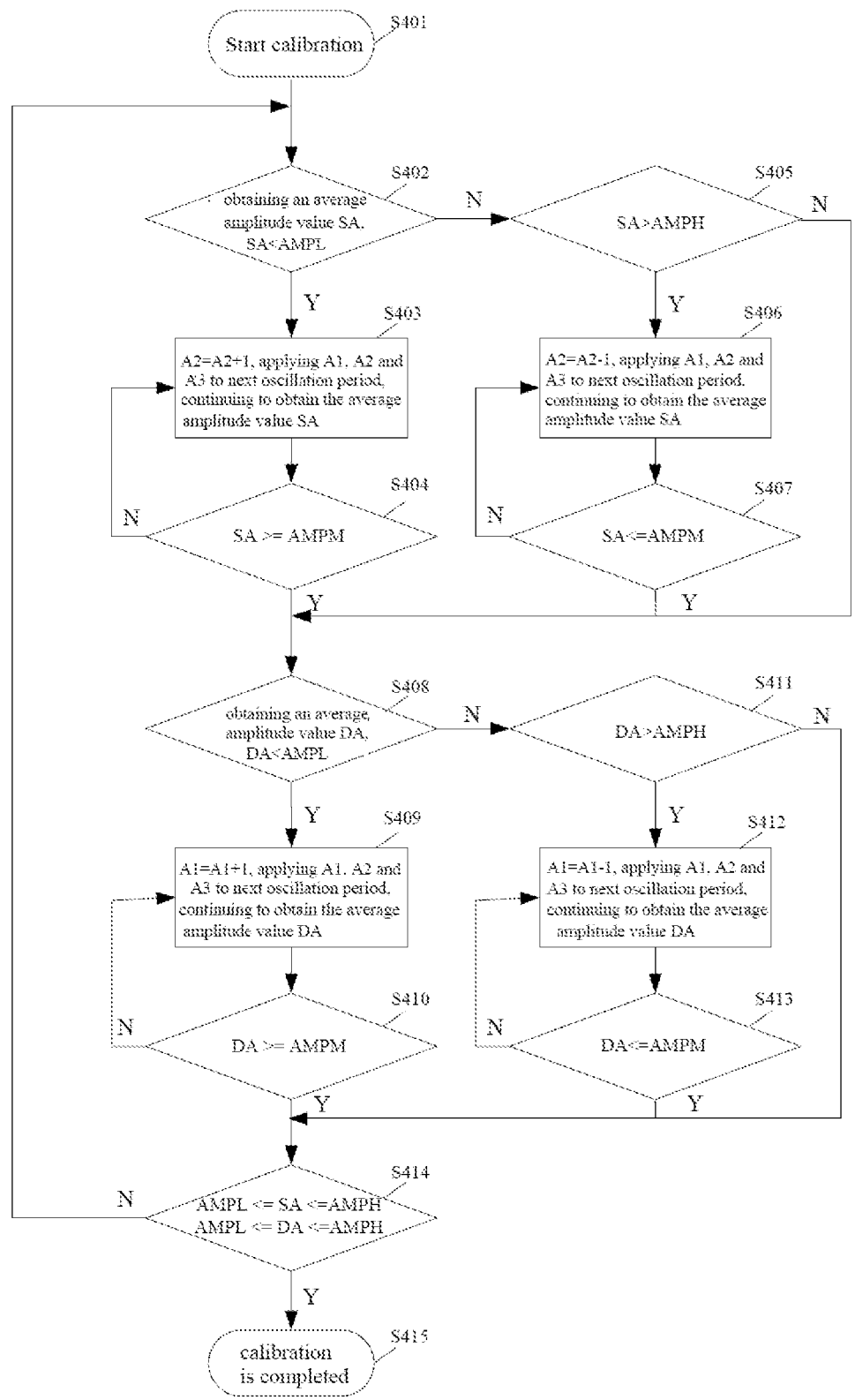
FIG. 4 is a flowchart of a method for calibrating driving amplitude of a gyroscope sensor according to an embodiment.

FIG. 4 is a flowchart of a method for calibrating driving amplitude of a gyroscope sensor according to an embodiment.

A method of calibrating driving amplitude of a gyroscope sensor includes the steps of:

Step S401: starting calibration, initializing AMPL, AMPM, AMPH, A1, A2, and A3.

Step S402: obtaining an average amplitude value SA of the latter N waveforms of the resonance maintaining phase 302, determining whether SA is lower than the lowest target amplitude value AMPL. If yes, then the method jumps to step S403, if not, then jumps to step S405.

Step S403: increasing the preset amplitude value of the resonance maintaining phase 302, then obtaining A3 through the increased A2, the unadjusted A1, and the formula (4), and applying the unadjusted A1, the adjusted A2, and the adjusted A3 to a next oscillation period. In the illustrated embodiment, A2 is processed by adding 1 itself.

Step S404: determining whether SA is not lower than the optimal target amplitude value AMPM. If yes, then jumping to step S408, if not, then jump to step S403. The determining step is performed in the next oscillation period mentioned in step S403.

Step S405: determining whether SA is higher than the highest target amplitude value AMPH. If yes, then jumping to step S406, if not, then jumping to step S408.

Step S406: reducing the preset amplitude value A2 of the resonance maintaining phase 302, then obtaining A3 through the adjusted A2, the unadjusted A1 and the formula (4), and applying the unadjusted A1, the adjusted A2 and the adjusted A3 to the next oscillation period, continuing to obtain SA. In the illustrated embodiment, A2 is processed by subtracting 1 itself.

Step S407: determining whether SA is not higher than the optimal target amplitude value AMPM. If yes, then jumping to step S408, if not, then jumping to step S406. The determining step is performed in the next oscillation period mentioned in step S406.

In step S403 and S404, once the amplitude of SA is less than the preset low quasi-potential (the lowest target amplitude value) AMPL, it means the driving amplitude (A2) of the resonance maintaining phase 302 is probably too small, and A2 should be increased until the amplitude of SA in the next period is greater than or equal to AMPM. Similarly, in step S406 and S407, if the amplitude of SA is greater than the preset high quasi-potential (the highest target amplitude value) AMPH, then A2 is decreased until the amplitude of SA is less than or equal to AMPM.

Before the calibration method proceeds to step S408, the latter segment response amplitude SA (the average amplitude value of the latter N waveforms) of the resonance maintaining phase 302 is approaching AMPM slowly, however, since the response amplitude of the resonance maintaining phase 302 is influenced by the driving amplitude (A1) of the compulsory resonance phase 301, it is necessary to adjust the driving amplitude A1 of the compulsory resonance phase 301, such that a interval amplitude of the resonance maintaining phase 302 can be kept stable during the whole period. The latter steps S408, S409, S410, S411, S412, and S413 will be adjusted according to the average amplitude value DA of the former N waveforms of the resonance maintaining phase 302.

Of course, in other embodiments, there is no need to proceed to the step of adjusting A1 according to DA, because a detection of a sensor signal is closer to the rear end of the resonance maintaining phase 302, thus the closer the rear end SA of the resonance maintaining phase 302 approaches AMPM, the better it can be used to recover the detection of signal, thus as long as AMPL<=SA<=AMPH, the calibration is completed.

Step S408: obtaining the average amplitude value DA of the former N waveforms of the resonance maintaining phase 302, determining whether DA is lower than the lowest target amplitude value AMPL. If yes, then jumping to step S409, if not, then jumping to step S411.

Step S409: increasing the preset amplitude value A1 of the compulsory resonance phase 301, then obtaining A3 through the increased A1, the unadjusted A2, and the formula (4), and applying the adjusted A1, the unadjusted A2, and the adjusted A3 to the next oscillation period, continuing to obtain DA. In the illustrated embodiment, A1 are processed by adding 1 itself.

Step S410: determining whether DA is not lower than the optimal target amplitude value AMPM. If yes, then jumping to step S409, if not, then jumping to step S414. The determining step is executed in the next oscillation period mentioned in step S409.

Step S411: determining whether DA is higher than the highest target amplitude value AMPH. If yes, then jumping to step S412, if not, then jumping to step S414.

Step S412: reducing the preset amplitude value A1 of the compulsory resonance phase 301, then obtaining A3 through the reduced A1, the unadjusted A2 and, the formulae (4), and applying the adjusted A1, the unadjusted A2, and the adjusted A3 to the next oscillation period, continuing to obtain DA. In the illustrated embodiment, A1 are processed by subtracting 1 itself.

Step S413: determining whether DA is not higher than the optimal target amplitude value AMPM. If yes, then jumping to step S414, if not, then jumping to step S412. The determining step is executed in the next oscillation period mentioned in step S412.

Step S414: determining whether AMPL<=SA<=AMPH and AMPL<=DA<=AMPH are satisfied. If yes, then jumping to step S415, if not, then jumping to step S402.

Step S415: the calibration is completed.

When the amplitude of DA is less than AMPL, step S409 and S410 will be successively increased by A1 to increase the response of DA until DA is greater than or equal to AMPM. Similarly, when the amplitude of DA is greater than AMPH, step S412 and S413 will successively be reduced by A1 to decrease the response of DA until DA is less than or equal to AMPM.

During the adjustment of A2 and A1, since the amplitudes of SA and DA are influenced by each other and positively correlated, if the detection of step S414 cannot be past, it is required to start from step S402 once again and then performing calibration. Finally, ideal driving amplitudes of A1, A2 and A3 can be obtained and the response amplitude of the resonance maintaining phase 302 is approaching AMPM to maintain steady angular velocity detection.

In some embodiments, the adjustment of SA and DA may be carried out simultaneously, i.e., SA and DA are adjusted synchronously in each oscillation phase, and it is not necessary to adjust one of SA and DA in each oscillation phase as in the illustrated embodiment.

The optimal target amplitude value AMPM in step S404 and S410 can be replaced by the lowest target amplitude value AMPL, and the optimal target amplitude value AMPM in step S407, S413 can be replaced by the highest target amplitude value AMPH, as long as the value of DA and SA 1 is calibrated between AMPL and AMPH.

Figure 5:
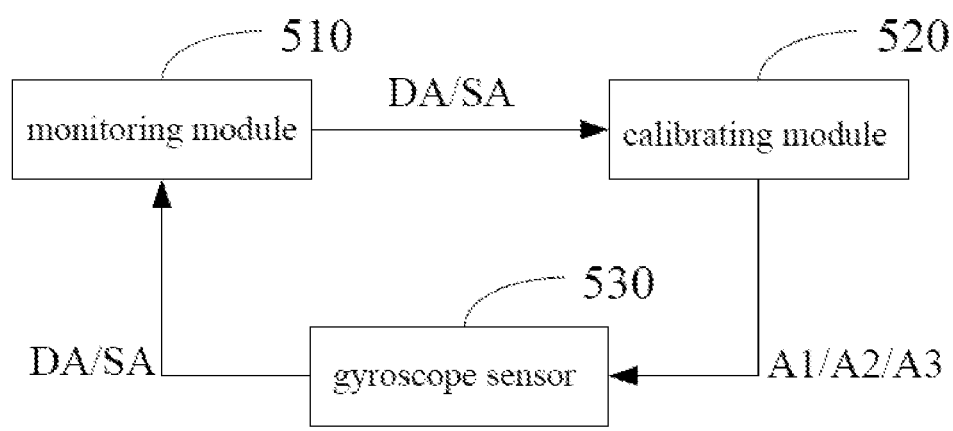
FIG. 5 is a block diagram of a system for calibrating driving amplitude of a gyroscope sensor according to an embodiment.

Referring to FIG. 5, there is also disclosed a system of calibrating driving amplitude of a gyroscope sensor, which includes a monitoring module 510, a calibrating module 520, and a gyroscope sensor 530. Referring to FIG. 2, in the illustrated embodiment, the monitoring module 510 at least includes a charge amplifier 201 and an amplitude phase and an angular velocity detector 202 in FIG. 2. The calibrating module 520 at least includes an amplitude calibration module 206 in FIG. 2.

The monitoring module 510 is configured to obtain the average amplitude value SA of N waveforms of the latter segment of the resonance maintaining phase 302.

The calibrating module 520 is configured to determine the relationship between the average amplitude value SA of N waveforms of the latter segment of the resonance maintaining phase 302 and the lowest target amplitude value AMPL and the highest target amplitude value AMPH. If SA is lower than AMPL, then increasing the preset amplitude value A2 of the resonance maintaining phase; if SA is higher than AMPH, then reducing A2. The calibrating module 520 is further configured to adjust the preset amplitude value A3 of the resonance ceasing phase, and to apply the unadjusted A1, the adjusted A2, and the adjusted A3 to the next oscillation period.

With gradually calibrating A2 through SA, a latter segment response amplitude (the average amplitude value of the latter N waveforms) of the resonance maintaining phase 302 is approaching AMPM slowly, however, since the response amplitude of the resonance maintaining phase 302 is influenced by the driving amplitude (A1) of the compulsory resonance phase 301, it is necessary to adjust the driving amplitude A1 of the compulsory resonance phase 301, such that a interval amplitude of the resonance maintaining phase 302 can be kept stable during the whole period. Therefore, the system will adjust A1 according to the average amplitude value DA of the former N waveforms of the resonance maintaining phase 302 later.

Of course, in other embodiments, there is no need to proceed to the step of adjusting A1 according to DA, because a detection of a sensor signal is closer to the rear end of the resonance maintaining phase 302, thus the closer the rear end SA of the resonance maintaining phase 302 approaches AMPM, the better it can be used to recovery the detection of signal, thus as long as AMPL<=SA<=AMPH, the calibration is completed.

The monitoring module 510 is also configured to obtain the average amplitude value DA of N waveforms of the former segment of the resonance maintaining phase.

The calibrating module 520 is also configured to determine the relationship between the average amplitude value of N waveforms of the former segment of the resonance maintaining phase 302 and the lowest target amplitude value AMPL and the highest target amplitude value AMPH, if DA is lower than AMPL, then increasing the preset amplitude value A1 of the compulsory resonance phase; if DA is higher than AMPH, then reducing A1. The calibrating module 520 is also configured to adjust A3 according to the adjusted A1, and to apply the adjusted A1, the unadjusted A2, and the adjusted A3 to the next oscillation period.

Finally, ideal driving amplitudes of A1, A2 and A3 can be obtained and the response amplitude of the resonance maintaining phase 302 is maintained between the lowest target amplitude value AMPL and the highest target amplitude value AMPH to maintain steady angular velocity detection.

In some embodiments, the steps of adjusting SA and DA may be performed simultaneously, i.e., SA and DA are adjusted synchronously in each oscillation phase, and it is not necessary to adjust one of SA and DA in each oscillation phase as in the illustrated embodiment, thus it may accelerate converge, and will also probably vibrate, it is required to set the adjusted magnitude.

It should be understood that although the various steps in the flowchart of FIG. 4 may be successively displayed as indicated by the arrow, these steps do not necessarily execute as indicated by the arrow successively. Unless definite explanation herein, the order of the execution of these steps is not strictly limited, and these steps may be executed in other order. Furthermore, at least a part of the steps in FIG. 4 may includes a plurality of sub-steps or multiple stages, these sub-steps or stages are not necessarily carried out successively, but may be carried out with other steps or at least a part of other sub-steps or stages in turn or alternately.

The above embodiments merely express several embodiments of the present invention, which describes particularly and in detail, but cannot be interpreted to limit the scope of the present invention. It should be pointed that certain variation and modification may be made for those skilled in the art without departing from the concept of the present invention, which belong to the scope of the present invention. Thus, the scope of the present invention should be determined by the appended claims.

What is claimed is:

1. A method of calibrating a driving amplitude of a gyroscope sensor, comprising:
a monitoring step: obtaining an average amplitude value of a first preset number of waveforms in a resonance maintaining phase; and
a calibrating step: if the average amplitude value is lower than a lowest target amplitude value, then increasing a preset amplitude value in the resonance maintaining phase; if the average amplitude value is higher than a highest target amplitude value, then reducing the preset amplitude value in the resonance maintaining phase; adjusting a preset amplitude value in a resonance ceasing phase according to the adjusted preset amplitude value in the resonance maintaining phase, and applying the adjusted preset amplitude value in the resonance maintaining phase, an unadjusted preset amplitude value in a compulsory resonance phase, and the adjusted preset amplitude value in the resonance ceasing phase to a next oscillation period.

2. The method according to claim 1, wherein
the monitoring step comprises: obtaining an average amplitude value of the first preset number of waveforms of a latter segment of the resonance maintaining phase;
the calibrating step comprises: if the average amplitude value of the first preset number of waveforms of the latter segment of the resonance maintaining phase is lower than the lowest target amplitude value, then increasing the preset amplitude value in the resonance maintaining phase; if the average amplitude value of the first preset number of waveforms of the latter segment of the resonance maintaining phase is higher than the highest target amplitude value, then reducing the preset amplitude value in the resonance maintaining phase; adjusting the preset amplitude value in the resonance ceasing phase according to the adjusted preset amplitude value in the resonance maintaining phase, and applying the adjusted preset amplitude value in the resonance maintaining phase, the unadjusted preset amplitude value in the compulsory resonance phase, and the adjusted preset amplitude value in the resonance ceasing phase to next the oscillation period.

3. The method according to claim 2, wherein the calibrating step comprises:
if the average amplitude value of the first preset number of waveforms of the latter segment of the resonance maintaining phase is not higher than the highest target amplitude value and not lower than the lowest target amplitude value, obtaining the average amplitude value of the first preset number of waveforms of a former segment of the resonance maintaining phase;
if the average amplitude value of the first preset number of waveforms of the latter segment of the resonance maintaining phase is lower than the lowest target amplitude value, then increasing the preset amplitude value of the resonance maintaining phase; if the average amplitude value of the first preset number of waveforms of the latter segment of the resonance maintaining phase is higher than the highest target amplitude value, then reducing the preset amplitude value of the resonance maintaining phase;
adjusting the preset amplitude value in the resonance ceasing phase according to the adjusted preset amplitude value in the resonance maintaining phase, and applying the adjusted preset amplitude value in the resonance maintaining phase, an unadjusted preset amplitude value in the compulsory resonance phase, and the adjusted preset amplitude value in the resonance ceasing phase to the next oscillation period;
upon adjusting, if the average amplitude value of the first preset number of waveforms of the latter segment of the resonance maintaining phase is not higher than the highest target amplitude value and not lower than the lowest target amplitude value, obtaining the average amplitude value of the first preset number of waveforms of a former segment of the resonance maintaining phase;
if the average amplitude value of the first preset number of waveforms of the former segment of the resonance maintaining phase is lower than the lowest target amplitude value, then increasing the preset amplitude value of the compulsory resonance phase; if the average amplitude value of the first preset number of waveforms of the former segment of the resonance maintaining phase is higher than the highest target amplitude value, then reducing the preset amplitude value of the compulsory resonance phase; and
adjusting the preset amplitude value of the resonance ceasing phase according to the adjusted preset amplitude value of the compulsory resonance phase, and applying the unadjusted preset amplitude value of the resonance maintaining phase, the adjusted preset amplitude value of the compulsory resonance phase, and the adjusted preset amplitude value of the resonance ceasing phase to next oscillation period.

4. The method according to claim 3, wherein upon adjusting, if the average amplitude value of the first preset number of waveforms of the latter segment of the resonance maintaining phase is not higher than the highest target amplitude value and not lower than the lowest target amplitude value, the step of obtaining the average amplitude value of the first preset number of waveforms of the former segment of the resonance maintaining phase comprises:
after increasing the preset amplitude value of the resonance maintaining phase, if the average amplitude value of the first preset number of waveforms of the latter segment of the resonance maintaining phase is not lower than an optimal target amplitude value, or after reducing the preset amplitude value of the resonance maintaining phase, if the average amplitude value of the first preset number of waveforms of the latter segment of the resonance maintaining phase is not higher than the optimal target amplitude value, obtaining the average amplitude value of the first preset number of waveforms of the former segment of the resonance maintaining phase; the optimal target amplitude value is not lower than the lowest target amplitude value and not higher than the highest target amplitude value;
after increasing the preset amplitude value of the resonance maintaining phase, if the average amplitude value of the first preset number of waveforms of the latter segment of the resonance maintaining phase is lower than the optimal target amplitude value, continuing to increase the preset amplitude value of the resonance maintaining phase, and adjusting the preset amplitude value of the resonance ceasing phase according to the adjusted preset amplitude value of the resonance maintaining phase, and applying the adjusted preset amplitude value of the resonance maintaining phase, the unadjusted preset amplitude value of the compulsory resonance phase, and the adjusted preset amplitude value of the resonance ceasing phase to next the oscillation period; and after reducing the preset amplitude value of the resonance maintaining phase, if the average amplitude value of the first preset number of waveforms of the latter segment of the resonance maintaining phase is higher than the optimal target amplitude value, continuing to reduce the preset amplitude value of the resonance maintaining phase, and adjusting the preset amplitude value of the resonance ceasing phase according to the adjusted preset amplitude value of the resonance maintaining phase, and applying the adjusted preset amplitude value of the resonance maintaining phase, the unadjusted preset amplitude value of the compulsory resonance phase, and the adjusted preset amplitude value of the resonance ceasing phase to next the oscillation period.

5. The method according to claim 4, wherein after adjusting the preset amplitude value of the resonance ceasing phase according to the adjusted preset amplitude value of the compulsory resonance phase, and applying the unadjusted preset amplitude value of the resonance maintaining phase, the adjusted preset amplitude value of the compulsory resonance phase, and the adjusted preset amplitude value of the resonance ceasing phase to next the oscillation period, the method further comprises:

after increasing the preset amplitude value of the compulsory resonance phase, if the average amplitude value of the first preset number of waveforms of the former segment of the resonance maintaining phase is not lower than the optimal target amplitude value, or after reducing the preset amplitude value of the compulsory resonance phase, if the average amplitude value of the first preset numerical value of the former segment of the resonance maintaining phase is not higher than the optimal target amplitude value, by this time, if the average amplitude value of the first preset number of waveforms of the latter segment of the resonance maintaining phase is not higher than the highest target amplitude value and not lower than the lowest target amplitude value, and the average amplitude of the first preset number of waveforms of the former segment of the resonance maintaining phase is not higher than the highest target amplitude value and not lower than the highest target amplitude value, the calibrating step is completed;

after increasing the preset amplitude value of the compulsory resonance phase, if the average amplitude value of the first preset number of waveforms of the former segment of the resonance maintaining phase is lower than the optimal target amplitude value, continuing to increase the preset amplitude value of the compulsory resonance phase, and adjusting the preset amplitude value of the resonance ceasing phase according to the adjusted preset amplitude value of the compulsory resonance phase, and applying the unadjusted preset amplitude value of the resonance maintaining phase, the adjusted preset amplitude value of the compulsory resonance phase, and the adjusted preset amplitude value of the resonance ceasing phase to the next oscillation period; and after reducing the preset amplitude value of the compulsory resonance phase, if the average amplitude value of the first preset number of waveforms of the former segment of the resonance maintaining phase is higher than the optimal target amplitude value, continuing to reduce the preset amplitude value of the compulsory resonance phase, and adjusting the preset amplitude value of the resonance ceasing phase according to the adjusted preset amplitude value of the compulsory resonance phase, and applying the unadjusted preset amplitude value of the resonance maintaining phase, the adjusted preset amplitude value of the compulsory resonance phase, and the adjusted preset amplitude value of the resonance ceasing phase to the next oscillation period.

6. The method according to claim 1, wherein a half of a difference value between the lowest target amplitude value and the highest target amplitude value is greater than a noise value of the gyroscope sensor.

7. A system of calibrating a driving amplitude of a gyroscope sensor, comprising:

a monitoring module configured to obtain an average amplitude value of a first preset number of waveforms of a resonance maintaining phase; and a calibrating module configured to determine a relationship between the average amplitude value and a lowest target amplitude value, and between the average amplitude value and a highest target amplitude value; if the average amplitude value is higher than the highest target amplitude value, then reducing a preset amplitude value in the resonance maintaining phase; adjusting a preset amplitude value in a resonance ceasing phase according to the adjusted preset amplitude value in the resonance maintaining phase, and applying the adjusted preset amplitude value in the resonance maintaining phase, an unadjusted preset amplitude value in a compulsory resonance phase, and the adjusted preset amplitude value in the resonance ceasing phase to a next oscillation period.

8. The system according to claim 7, wherein the monitoring module is configured to obtain an average amplitude value of the first preset number of waveforms of a latter segment of the resonance maintaining phase;

the calibrating module is configured to determine a relationship between the average amplitude value of the first preset number of waveforms of the latter segment of the resonance maintaining phase and the lowest target amplitude value, and between the average amplitude value of the first preset number of waveforms of the latter segment of the resonance maintaining phase and the highest target amplitude value; if the average amplitude value of the first preset number of waveforms of the latter segment of the resonance maintaining phase is lower than the lowest target amplitude value, then increasing the preset amplitude value of the resonance maintaining phase; if the average amplitude value of the first preset number of waveforms of the latter segment of the resonance maintaining phase is higher than the highest target amplitude value, then reducing the preset amplitude value of the resonance maintaining phase; adjusting the preset amplitude value of the resonance ceasing phase according to the adjusted preset amplitude value of the resonance maintaining phase, and applying the adjusted preset amplitude value of the resonance maintaining phase, the unadjusted preset amplitude value of the compulsory resonance phase, and the adjusted preset amplitude value of the resonance ceasing phase to the next oscillation period.

* * * * *